United States Patent [19]
Bron

[11] Patent Number: 4,524,913
[45] Date of Patent: Jun. 25, 1985

[54] SELF-REGULATING SPRINKLER NOZZLE

[76] Inventor: Dan Bron, 36 Palmach St., Haifa, Israel

[21] Appl. No.: 577,309

[22] Filed: Feb. 6, 1984

Related U.S. Application Data

[63] Continuation of Ser. No. 276,195, Jun. 22, 1981, abandoned.

[30] Foreign Application Priority Data

Jul. 2, 1980 [IL] Israel .......................... 58176

[51] Int. Cl.³ .............................................. B05B 3/04
[52] U.S. Cl. ............................. 239/222.17; 239/451; 239/572
[58] Field of Search .............. 239/214, 222.11, 222.17, 239/223, 225, 231, 232, 237, 240, 252, 256, 262, 380–383, 451, 570, 571, 572, 206

[56] References Cited

U.S. PATENT DOCUMENTS

| | | | |
|---|---|---|---|
| 1,161,205 | 11/1915 | Finley | 239/222.17 |
| 1,862,381 | 6/1932 | Le Moon | 239/256 |
| 2,509,576 | 5/1950 | Morgan | 239/252 |
| 2,949,241 | 8/1960 | Slonim | 239/383 |
| 3,034,728 | 5/1962 | Hruby, Jr. | 239/222.17 |
| 3,397,842 | 8/1968 | Frandsen | 239/206 |
| 3,485,451 | 12/1969 | Gore et al. | 239/383 |
| 3,954,223 | 5/1976 | Wichman et al. | 239/570 |
| 4,026,471 | 5/1977 | Hunter | 239/206 |
| 4,161,291 | 7/1979 | Bentley | 239/570 |
| 4,290,557 | 9/1981 | Rosenberg | 239/383 |
| 4,344,576 | 8/1982 | Smith | 239/570 |

Primary Examiner—Jeffrey V. Nase
Assistant Examiner—Michael J. Forman
Attorney, Agent, or Firm—Murray Schaffer

[57] ABSTRACT

There is provided a self-regulating sprinkling nozzle attachable to a liquid-carrying line. The nozzle comprises a housing, a vortex chamber inside the housing, a vortex-producing inlet means through which the liquid enters the vortex chamber. One wall of the chamber is constituted by a first surface of a stretchable diaphragm and the opposite wall of the chamber is provided with an aperture leading to the atmosphere. The second surface of the diaphragm is exposed to line pressure. The nozzle also comprises rotor disposed in a drive space and means entrained and set spinning by the vortex. A shaft portion of the rotor means passes through the aperture, and a liquid-throwing member is fixedly attached to, and spun by, the shaft portion as a result of the action of the vortex on the rotor means.

10 Claims, 4 Drawing Figures

SELF-REGULATING SPRINKLER NOZZLE

This is a continuation of U.S. Ser. No. 276,195, filed June 22, 1981, now abandoned.

The present invention relates to a self-regulating sprinkling nozzle attachable to a liquid-carrying line.

Sprinklers have become a very popular means of irrigation for certain types of crops, as well as for lawns, flower beds, etc. They are relatively inexpensive, reliable, portable and easily arranged to cover any surface configuration. They suffer, however, from a serious drawback: their throw, i.e., the size and shape of the area a single sprinkler can cover has so far depended on water pressure in the mains which is almost never constant. Thus, when pressure is high, e.g., when the district water reservoir is full, or when the number of consumers at any particular time is low, sprinkler throw is large and, conversely, at low-pressure conditions, the same sprinklers have a much smaller throw. Consequently, at high-pressure conditions, a field irrigated by a number of sprinklers may suffer from local overirrigation due to excessive overlap of the circular areas "swept" by the individual sprinklers, while low-pressure conditions may cause local underirrigation due to the excessive size of "blind" spots.

The situation in this respect was improved with the appearance, on the market, of self-regulated, vortex-type irrigation devices. These features, however, proved to be efficient only when applied to drip-irrigation devices. Sprinklers thus modified were seen to have insufficient throw or an undesirable droplet spectrum, or both.

It is one of the objectives of the present invention to overcome the drawbacks of the prior-art sprinklers and to provide a sprinkler which is self-regulated and, therefore, as concerns throw, output and droplet-size spectrum, largely unaffected by fluctuations in main-line pressure.

This the invention achieves by providing a self-regulating sprinkling nozzle attachable to a liquid-carrying line, comprising a housing, a vortex chamber inside said housing, a vortex-producing inlet means through which said liquid enters said vortex chamber, one wall of said chamber being constituted by first surface of a stretchable diaphragm and the opposite wall of said chamber being provided with an aperture leading to the atmosphere, the second surface of said diaphragm being exposed to line pressure, further comprising rotor means disposed in a drive space, said rotor means being entrained and set spinning by said vortex propagated into said drive space, a shaft portion of which rotor means passes through said aperture, and a liquid-throwing member fixedly attached to, and spun by, said shaft portion as a result of the action of said vortex on said rotor means.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice. In the drawings:

Figure 1:
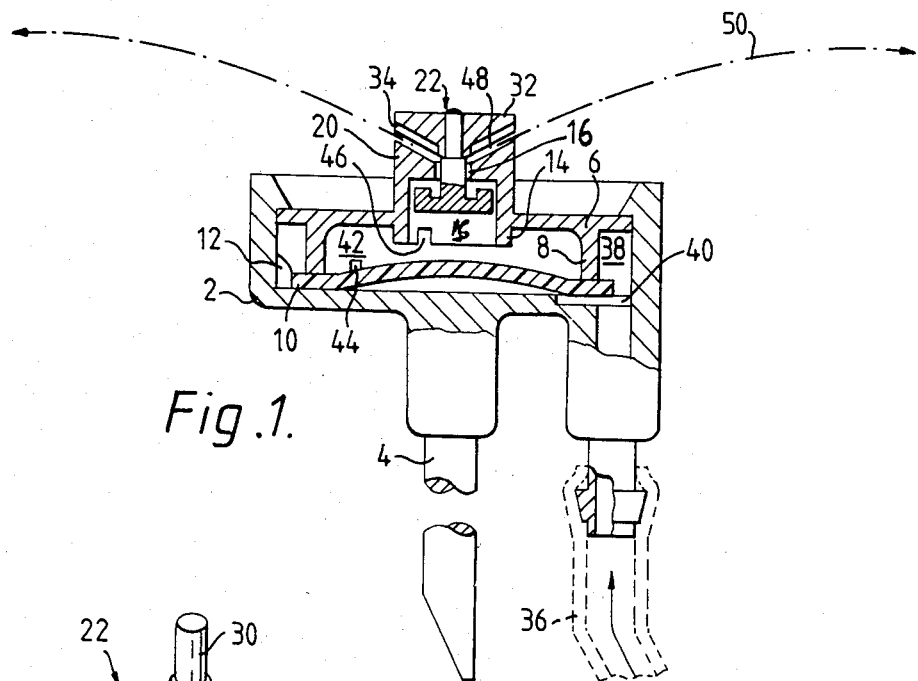
FIG. 1 is a partly cross-sectional view of embodiment of the sprinkling nozzle according to the invention.
Figure 4:
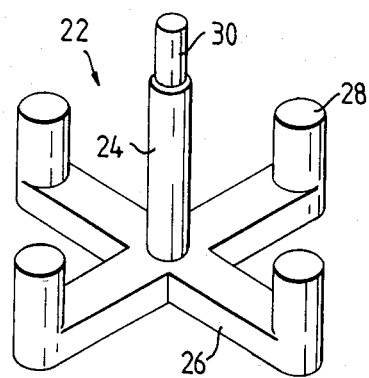
FIG. 4 is a perspective view of the rotor shown in FIG. 1.
Figure 3:
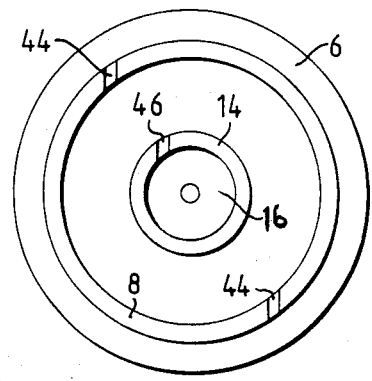
FIG. 3 is a bottom view of the cover plate of the nozzle of FIG. 1.
Figure 2:
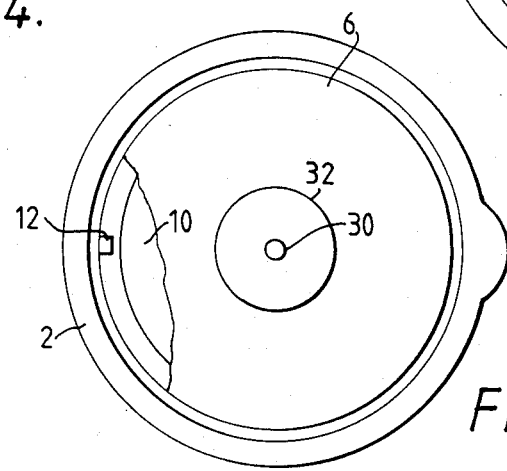
FIG. 2 is a partly cut-away top view of the nozzle of FIG. 1.

Referring now to the drawings, there is seen in FIG. 1 a two-part housing, the lower member 2 of which is provided with a detachable stake 4, by means of which the housing can be mounted on, or above, the ground. The upper housing member is in the form of a snap-in cover plate 6 and comprises a first rim section 8 which serves to hold down, against the bottom of the lower member 2, a stretchable diaphragm 10, centered within the bottom area by a number of circumferentially spaced projections 12, seen to better advantage in the cut-away top view of FIG. 2. The cover plate 6 is further provided with a second, central, rim section 14 defining the entrance to drive space 16, the access to which, in a manner to be explained further below, is controlled by the diaphragm 10. The drive space 16 communicates with the atmosphere via an aperture 18, seen to better advantage in FIG. 3, a bottom view of the cover plate 6. The latter, on its outside, is provided with a hub-like projection 20 defining the space 16, including the aperture 18. As seen in FIG. 1, the face of the projection 20 is an inward and downward sloping surface of an inverted cone with an obtuse apex angle. Inside the drive space 16 there is located an anchor-shaped rotor 22 (see FIG. 4) comprising a central shaft 24 from which extend a plurality of arms 26, each carrying on its end fluke-like projections 28. The upper portion 30 of the shaft 24 is of reduced diameter. In assumbly, as shown in FIG. 1, the shaft 24 passes with substantial clearance through the aperture 18 and carries on its reduced end 30 a thrower disk 32. The lower face of the disk 32 is tapering, having an apex angle substantially identical to that of the flaring top surface of the projection 20. On the tapering face of the disk 32 there are provided a number of substantially radial slots 34 which enhance the throwing effect.

In operation, the sprinkling nozzle according to the invention works as follows: Via a flexible tubing 36 which branches off the main line (not shown), water enters the sprinkler, filling the annular space 38 defined by the first rim section 8 of the cover plate 6 and the inside wall of the housing member 2. However, in order to leave the sprinkler by way of the outlet aperture 18—in a manner to be discussed further below—the water must first pass from the annular space 38 into a central space or vortex chamber 42. This it can do by passing through two tangential slots 44 (see also FIG. 3), of which in FIG. 1 only one can be seen. This tangential entry produces a vortex motion in the vortex chamber 42, which is also propagated into the drive space 16, further enhanced by yet another tangential slot 46, this time in the central rim section 14. The anchor-like rotor 22 is entrained by the vortex motion of the water rushing upwards and also sets spinning the thrower disk 32, with which it is fixedly connected. The water, passing through the annular clearance between the rotor shaft 24 and the wall of the aperture 18 now enters the conical gap 48 between the thrower disk 32 and the flaring top surface of the projection 20, producing a mushroom-like sheet of water 50 of considerable reach.

At this point, an explanation is in order concerning the role of the diaphragm 10 in the self-regulation feature of the sprinkling nozzle according to the invention.

Again consulting FIG. 1, it is seen that the water entering the nozzle via the tubing 36 also reaches the underside of the diaphragm 10 via an elongated, groove-like recess 40, which underside is thus impacted by line pressure. If one were now to close off the aperture 18, pressures on both sides of the stretchable diaphragm 10 would be equal, as the upper surface of the diaphragm would also be impacted by full line pressure. Being thus equal, these two pressures would cancel out one another, and the diaphragm 10 would rest in a flat, unstretched position. However, water entering the vortex chamber 42 through the tangential cover provided with a drive space communicating with said vortex chamber and having an aperture leading to the atmosphere, the second surface of said diaphragm being exposed to the pressure of the liquid in said liquid carrying line, said diaphragm being stretchable in response to variations in pressure between that in said liquid carrying line and that in said vortex chamber to vary the volume thereof and maintain the pressure in said vortex chamber constant, a spinner disposed in said drive space and entrained by said vortex propagated into said drive space, said spinner having a shaft which passes with substantial clearance through said aperture to permit liquid to flow therethrough, and a liquid-throwing member fixedly attached to the end of said shaft, and spun as a result of the action of said vortex on having a shaft extending through said aperture with substantial clearance to permit liquid to flow through said aperture and a member fixedly attached at the outer end of said shaft to cause said liquid to be flung in a substantially circular direction;

said diaphragm being stretchable in response to the difference in pressure between the liquid supplied to said second interior part and the liquid in said vortex chamber, the stretching of said diaphragm varying the volume of said vortex chamber to maintain the liquid flowing therethrough and out of said aperture at a constant rate.

10. The nozzle according to claim 9, wherein said housing body is formed of a pair of interlocking members, one of which is provided with a depending circular wall having at least one tangential hole therein, the diameter of said circular wall being less than that of said housing to define therewith an annular chamber forming the vortex producing inlet and within said circular wall the vortex chamber, and wherein the elastic diaphragm is interposed between said interlocking members and held fixedly in place between the depending wall and the other interlocking member.

* * * * *